(12) United States Patent
Liu

(10) Patent No.: US 11,217,210 B2
(45) Date of Patent: *Jan. 4, 2022

(54) METHOD FOR CONTROLLING DISPLAY OF SCREEN OF MOBILE TERMINAL, AND MOBILE TERMINAL

(71) Applicant: Advanced New Technologies Co., Ltd., Grand Cayman (KY)

(72) Inventor: Lindong Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,552

(22) Filed: May 17, 2021

(65) Prior Publication Data

US 2021/0272536 A1    Sep. 2, 2021

Related U.S. Application Data

(63) Continuation of application No. 16/601,344, filed on Oct. 14, 2019, now Pat. No. 11,011,141, which is a
(Continued)

(30) Foreign Application Priority Data

Nov. 30, 2016   (CN) .......................... 201611083914.4

(51) Int. Cl.
*G06K 7/10* (2006.01)
*G09G 5/38* (2006.01)
(Continued)

(52) U.S. Cl.
CPC ............. *G09G 5/38* (2013.01); *G06F 3/0481* (2013.01); *G06K 7/1413* (2013.01);
(Continued)

(58) Field of Classification Search
CPC ............. G09G 5/38; G09G 2340/0492; G06K 7/1413; G06K 7/1417; G06F 3/0481; H04M 1/0202
See application file for complete search history.

(56) References Cited

U.S. PATENT DOCUMENTS

| 7,995,178 B2 | 8/2011 | Suguro et al. |
| 8,556,176 B2 | 10/2013 | Van Horn et al. |

(Continued)

FOREIGN PATENT DOCUMENTS

| CN | 104122985 | 10/2014 |
| CN | 105955485 | 9/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Tuyen K Vo
(74) *Attorney, Agent, or Firm* — Fish & Richardson P.C.

(57) ABSTRACT

The present application relates to the field of computer technologies, and in particular, to a method for controlling display of a screen of a mobile terminal, and a mobile terminal. In the method for controlling the display of the screen of the mobile terminal, the mobile terminal can detect whether a beam emitted by a recognition apparatus arrives. When the mobile terminal detects that a beam arrives, the mobile terminal can determine whether the detected beam is in an inclined state. Once the mobile terminal detects that the beam is in the inclined state, the mobile terminal can adjust a display direction of interface content on a screen of the mobile terminal based on the inclined state of the beam.

20 Claims, 7 Drawing Sheets

Related U.S. Application Data continuation of application No. 16/397,382, filed on Apr. 29, 2019, now Pat. No. 10,446,120, which is a continuation of application No. PCT/CN2017/112604, filed on Nov. 23, 2017.

(51) Int. Cl.
   *G06K 7/14* (2006.01)
   *G06F 3/0481* (2013.01)
   *H04M 1/02* (2006.01)

(52) U.S. Cl.
   CPC ... *G06K 7/1417* (2013.01); *G09G 2340/0492* (2013.01); *H04M 1/0202* (2013.01)

(56) References Cited

U.S. PATENT DOCUMENTS

| | | |
|---|---|---|
| 9,564,104 B1 | 2/2017 | Letourneur et al. |
| 9,658,688 B2 | 5/2017 | Shen et al. |
| 10,068,221 B1 | 9/2018 | Thomas et al. |
| 10,446,120 B2 | 10/2019 | Liu |
| 2008/0278437 A1 | 11/2008 | Barrus et al. |
| 2011/0221667 A1 | 9/2011 | Lee |
| 2013/0048723 A1 | 2/2013 | King |
| 2013/0057571 A1 | 3/2013 | Harris |
| 2013/0181050 A1 | 7/2013 | McConnell |
| 2013/0222231 A1 | 8/2013 | Gardenfors et al. |
| 2013/0222270 A1 | 8/2013 | Winkler et al. |
| 2015/0079736 A1 | 4/2015 | Simske et al. |
| 2015/0097036 A1 | 4/2015 | Oh et al. |
| 2015/0097936 A1 | 4/2015 | Simske et al. |
| 2015/0123922 A1 | 5/2015 | Cao |
| 2019/0259354 A1 | 8/2019 | Liu |
| 2019/0370779 A1 | 12/2019 | Lee et al. |
| 2020/0111456 A1 | 4/2020 | Liu |

FOREIGN PATENT DOCUMENTS

| | | |
|---|---|---|
| CN | 105988556 | 10/2016 |
| CN | 106056026 | 10/2016 |
| CN | 107025035 | 8/2017 |
| EP | 3109750 | 12/2016 |
| EP | 3285198 | 3/2018 |
| EP | 3550402 | 9/2019 |
| JP | 2011022623 | 2/2011 |
| KR | 20110101585 | 9/2011 |
| KR | 20140005141 | 1/2014 |
| KR | 20150040596 | 4/2015 |
| RU | 2598780 | 9/2016 |
| RU | 2599178 | 10/2016 |
| WO | WO 2015056038 | 4/2015 |
| WO | WO 2018099318 | 6/2018 |

OTHER PUBLICATIONS

Extended European Search Report in European Application No. 17875303.4, dated Nov. 14, 2019, 9 pages.
International Preliminary Report on Patentability in International Application No. PCT/CN2017/112604, dated Jun. 4, 2019, 11 pages (with English Translation).
International Search Report and Written Opinion in International Application No. PCT/CN2017/112604, dated Feb. 22, 2018, 14 pages (with English Translation).
Nakamoto, "Bitcoin: A Peer-to-Peer Electronic Cash System," www.bitcoin.org, 2005, 9 pages.

METHOD FOR CONTROLLING DISPLAY OF SCREEN OF MOBILE TERMINAL, AND MOBILE TERMINAL

CROSS-REFERENCE TO RELATED APPLICATIONS

This application is a continuation of and claims the benefit of priority of U.S. patent application Ser. No. 16/601,344, filed Oct. 14, 2019, which is a continuation of U.S. application Ser. No. 16/397,382, filed on Apr. 29, 2019, now U.S. Pat. No. 10,446,120, which is a continuation of PCT Application No. PCT/CN2017/112604, filed on Nov. 23, 2017, which claims priority to Chinese Patent Application No. 201611083914.4, filed on Nov. 30, 2016, and each application is herein incorporated by reference in its entirety.

TECHNICAL FIELD

The present application relates to the field of computer technologies, and in particular, to a method for controlling display of a screen of a mobile terminal, and a mobile terminal.

BACKGROUND

In a conventional technology, when a recognition apparatus is used to recognize interface content on a screen of a mobile terminal, if the interface content has a strict requirement on a recognition angle, a user usually needs to manually repeatedly adjust a recognition angle of the recognition apparatus. For example, when a code scanning gun is used to recognize a barcode on the screen of the mobile terminal, the code scanning gun can recognize the barcode only when the code scanning gun and the barcode face each other and rotation angles of the code scanning gun and the barcode are similar. Therefore, the user needs to manually and repeatedly adjust a recognition angle of the code scanning gun, which affects efficiency of recognizing the interface content, and brings poor experience to the user.

SUMMARY

The present application describes a method for controlling display of a screen of a mobile terminal, and a mobile terminal, to improve efficiency of recognizing interface content.

According to a first aspect, a method for controlling display of a screen of a mobile terminal is provided, including: detecting, by a mobile terminal, a first beam; determining whether the detected first beam is in an inclined state, where the inclined state indicates that the first beam has an inclination angle that is greater than a first threshold in a predetermined direction, and the predetermined direction is determined based on a display direction of interface content on a screen of the mobile terminal; and when the detected first beam is in the inclined state, adjusting the display direction of the interface content on the screen of the mobile terminal based on the inclined state of the first beam.

According to a second aspect, a mobile terminal is provided, and the mobile terminal includes: a detection unit, configured to detect a first beam; a determining unit, configured to determine whether the first beam detected by the detection unit is in an inclined state, where the inclined state indicates that the first beam has an inclination angle that is greater than a first threshold in a predetermined direction, and the predetermined direction is determined based on a display direction of interface content on a screen of the mobile terminal; and an adjustment unit, configured to: when the determining unit determines that the detected first beam is in the inclined state, adjust the display direction of the interface content on the screen of the mobile terminal based on the inclined state of the first beam.

According to the method for controlling the display of the screen of the mobile terminal, and the mobile terminal provided in the present application, the mobile terminal can detect whether a beam emitted by a recognition apparatus arrives. When the mobile terminal detects that a beam arrives, the mobile terminal can determine whether the detected beam is in an inclined state. Once the mobile terminal detects that the beam is in the inclined state, the mobile terminal can adjust the display direction of the interface content on the screen of the mobile terminal based on the inclined state of the beam. Therefore, efficiency of recognizing the interface content on the screen of the mobile terminal is improved.

BRIEF DESCRIPTION OF DRAWINGS

To describe the technical solutions in the implementations of the present disclosure more clearly, the following briefly describes the accompanying drawings needed for describing the implementations. Apparently, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes implementations of the present disclosure with reference to accompanying drawings.

A method for controlling display of a screen of a mobile terminal provided in the present application is applicable to a scenario that a mobile terminal automatically adjusts a display direction of interface content on a screen of the mobile terminal based on an inclined state of a beam emitted by a recognition apparatus. The mobile terminal can be a mobile terminal that has a screen, for example, a mobile phone, a tablet, or a personal digital assistant (PDA), and the screen can be a touchscreen. In addition, the mobile terminal can further have a sensor such as a complementary metal-oxide-semiconductor (CMOS) or a charge coupled device (CCD), so that the mobile terminal can detect a beam by using the previous sensor. It is worthwhile to note that the interface content in the present application can include but is not limited to a barcode image, a two-dimensional code image, etc. The interface content can be recognized in a forward direction or a reverse direction, and the forward direction and the reverse direction are two directions with a difference of 180°.

Figure 1:
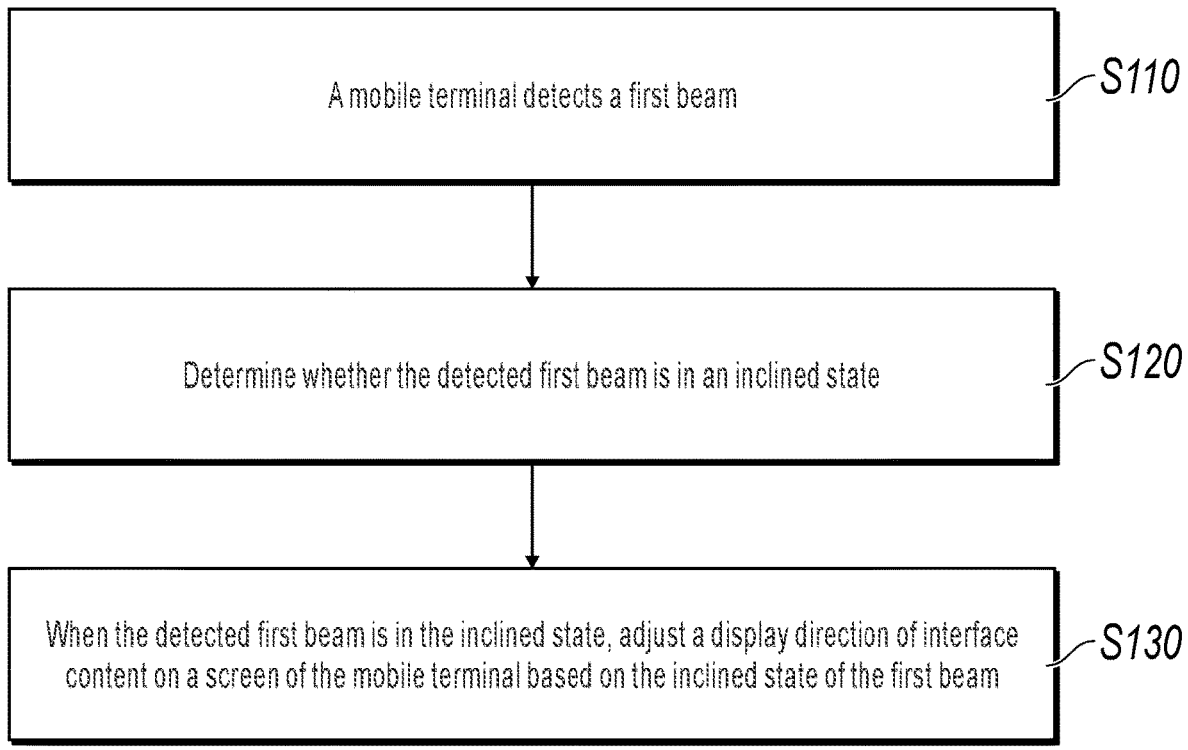
FIG. 1 is a flowchart illustrating a method for controlling display of a screen of a mobile terminal, according to an implementation of the present application.

FIG. 1 is a flowchart illustrating a method for controlling display of a screen of a mobile terminal, according to an implementation of the present application. The method can be performed by a mobile terminal. As shown in FIG. 1, the method can include the following steps.

Step 110: The mobile terminal detects a first beam.

Figure 2:
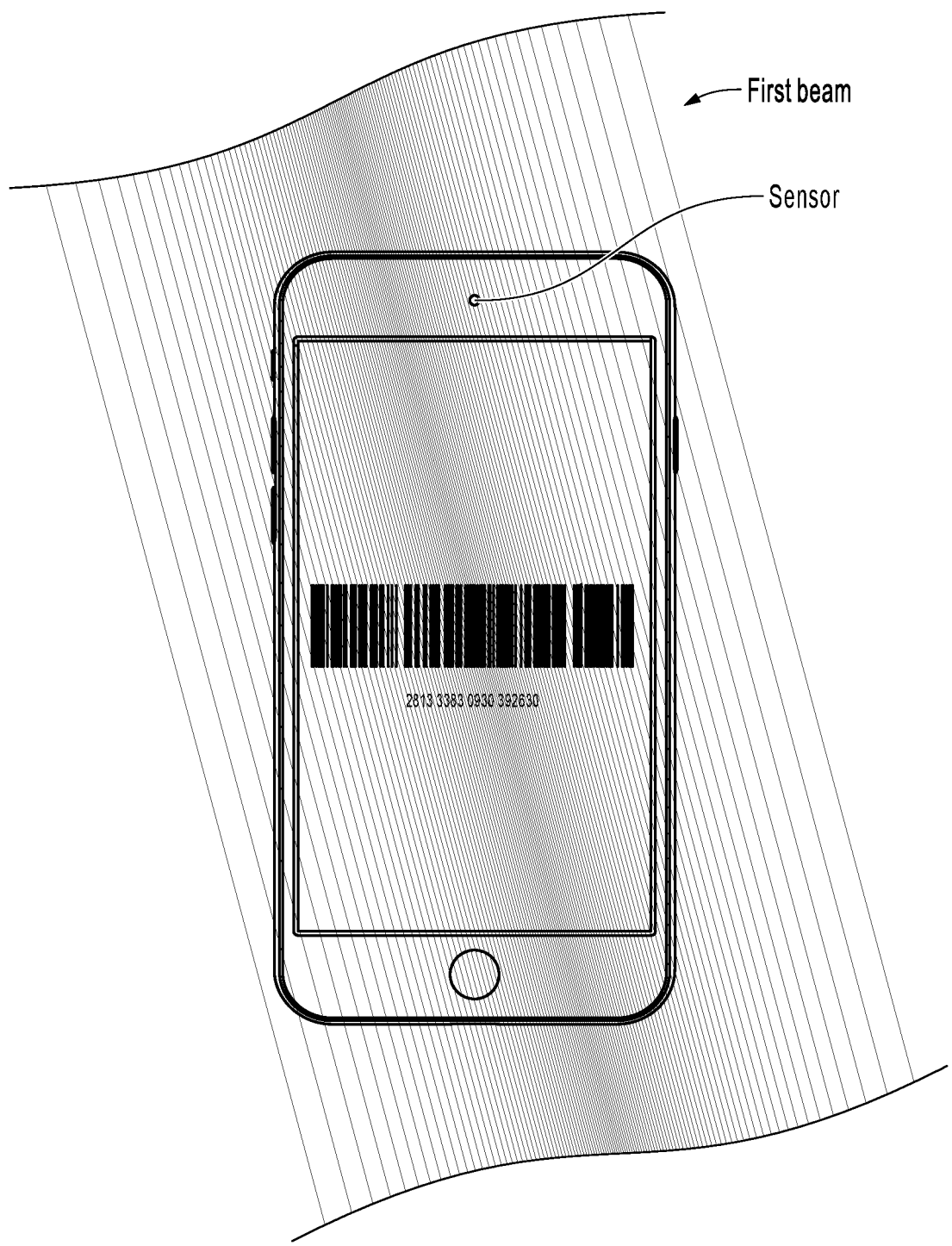
FIG. 2 is a schematic diagram illustrating a first beam, according to the present application.

The first beam is a beam that can be sensed by a sensor (e.g., a CMOS or a CCD) of the mobile terminal, for example, can be a laser beam, an infrared beam, or a visible beam. A type of the first beam can include a circular beam, a bar beam, etc. It is worthwhile to note that the first beam in the present application can be emitted by a recognition apparatus. For example, when the recognition apparatus is a code scanning gun, a first beam emitted by the code scanning gun can be shown in FIG. 2. In FIG. 2, the first beam is an infrared beam, and a shape of the infrared beam is a bar beam. When the infrared beam emitted by the code scanning gun covers a camera of the mobile terminal, the camera of the mobile terminal can sense the infrared beam, in other words, the mobile terminal can detect the first beam. The camera has a function of a sensor (e.g., a CMOS or a CCD).

Step 120: Determine whether the detected first beam is in an inclined state.

The inclined state indicates that the first beam has an inclination angle that is greater than a first threshold in a predetermined direction. For example, a user can incline the recognition apparatus that emits the first beam. The predetermined direction can be determined based on a display direction of interface content on a screen of the mobile terminal. In the present application, the display direction of the interface content can be used as the predetermined direction. In other words, the display direction of the interface content is the same as the predetermined direction. The display direction of the interface content can include an upward direction, a downward direction, a leftward direction, a rightward direction, a left-upward direction, a left-downward direction, a right-upward direction, or a right-downward direction. A reference object of the predetermined direction can include one or more of the following: the mobile terminal, a plane on which a touchscreen of the mobile terminal is located, a horizontal plane, a vertical plane, an X-axis and a Y-axis of the horizontal plane, an X-axis and a Y-axis of the vertical plane, an X-axis and a Y-axis of the plane on which the touchscreen of the mobile terminal is located, etc. The reference object can be selected and understood based on an actual situation. For other parts related to this in the present specification, references can be made to the description here. Details are omitted here for simplicity.

It is worthwhile to note that the first threshold can be set based on an empirical value. For example, when the recognition apparatus is a code scanning gun and the interface content is a barcode, the first threshold can be a maximum angle between the code scanning gun and the barcode when the barcode can be recognized by the code scanning gun.

In step 120, a process that the mobile terminal determines whether the detected first beam is in the inclined state can be as follows: The mobile terminal determines an angle between the first beam and the display direction of the interface content on the screen of the mobile terminal, determines whether the angle is greater than the first threshold, and if the angle is greater than the first threshold, determines that the first beam is in the inclined state. It can be understood that when the predetermined direction is the display direction of the interface content, the angle is the inclination angle.

Figure 3A:
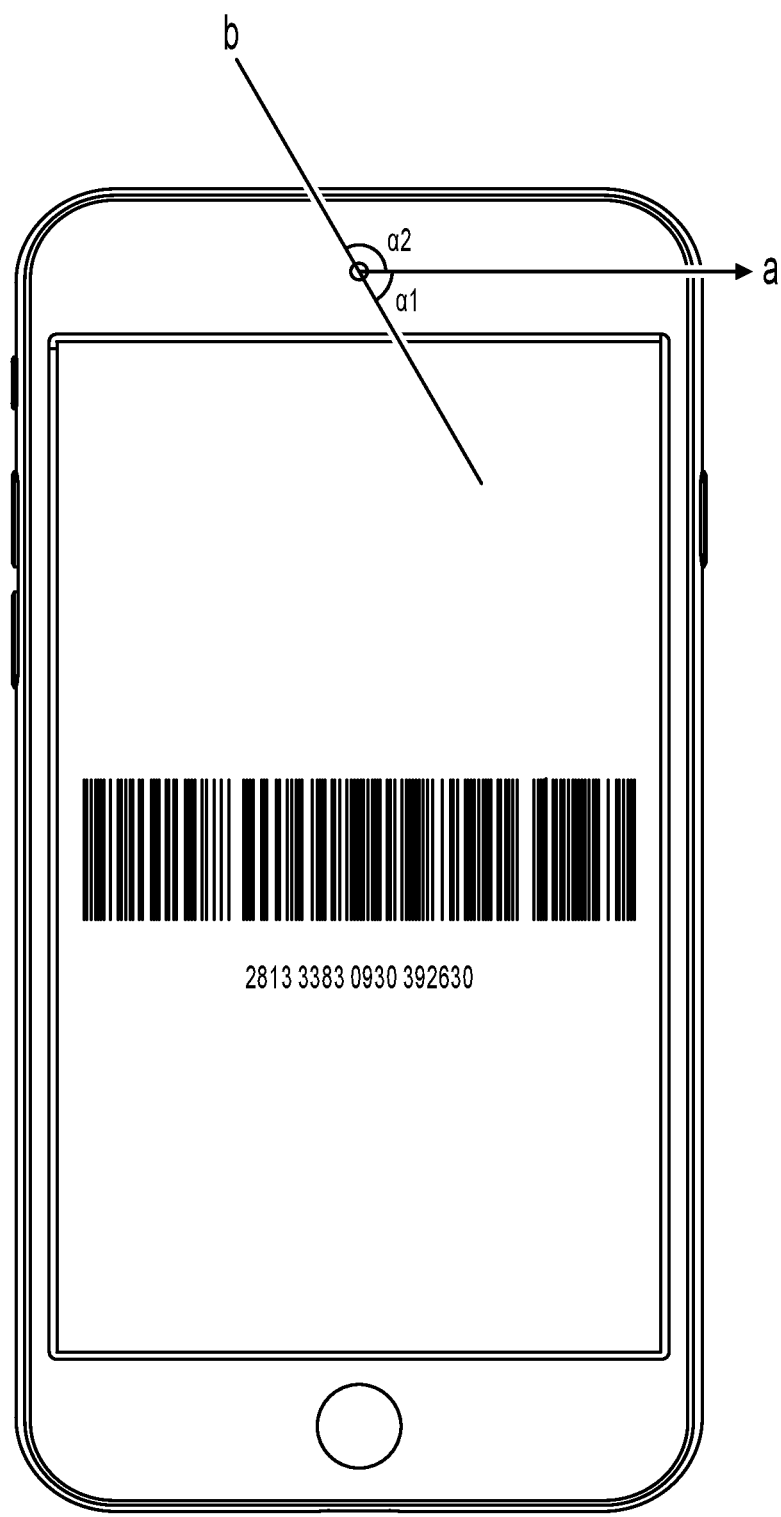
FIG. 3a is a first schematic diagram illustrating an angle between a first beam and interface content, according to the present application.

In an implementation, when the first beam is a bar beam, before the previous angle is determined, a characteristic line (namely, a straight line that can be used to represent the first beam) of the first beam detected by the mobile terminal can be first determined, and then the angle between the first beam and the display direction of the interface content on the screen of the mobile terminal is determined based on an angle between the characteristic line and the display direction of the interface content on the screen of the mobile terminal. FIG. 3a is used as an example. The interface content on the screen of the mobile terminal can be a barcode image, and a is a display direction (namely, a horizontally rightward direction) of the barcode image. In addition, b is a characteristic line of the first beam, in other words, the first beam does not have a direction. Therefore, α1 and α2 are angles between the first beam and the display direction of the barcode image. In other words, there are two angles, and the two angles are supplementary angles. It can be seen from FIG. 3a that value ranges of both α1 and α2 are [0, 180°]. It is worthwhile to note that only when both α1 and α2 are greater than the first threshold, it can be determined that the first beam is in the inclined state. It can be understood that if either angle (α1 or α2) is not greater than the first threshold, the first beam is not in the inclined state.

Step 130: When the detected first beam is in the inclined state, adjust a display direction of interface content on a screen of the mobile terminal based on the inclined state of the first beam.

The interface content can include but is not limited to a barcode image, a two-dimensional code image, etc. The interface content can be recognized in a forward direction or a reverse direction, and the forward direction and the reverse direction are two directions with a difference of 180°.

Step 130 can include the following steps.

Step A: Obtain an inclination angle and an inclination direction of the first beam when the detected first beam is in the inclined state.

Specifically, the mobile terminal can obtain the inclination angle and the inclination direction of the first beam when determining that the detected first beam is in the inclined state. The inclination direction can include an upward inclination direction, a downward inclination direction, a leftward inclination direction, a rightward inclination direction, a left-upward inclination direction, a left-downward inclination direction, a right-upward inclination direction, or a right-downward inclination direction. For example, the user can incline upwards, downwards, leftwards, and rightwards the recognition apparatus that emits the first beam, so that the first beam is in the upward, downward, leftward, and rightward inclination directions.

FIG. 3a is used as an example. When both α1 and α2 are greater than the first threshold, it can be determined that the first beam is in the inclined state. In FIG. 3a, two inclination angles that can be obtained are α1 and α2, an inclination direction corresponding to α1 is the downward inclination direction, and an inclination direction corresponding to α2 is the upward inclination direction. It can be understood that the first beam in FIG. 3a is obtained after a beam in the horizontally rightward direction (namely, the display direction of the barcode image) is rotated clockwise by an angle of α1, or is obtained after a beam in the horizontally rightward direction (namely, the display direction of the barcode image) is rotated anticlockwise by an angle of α2.

Step B: Adjust the display direction of the interface content on the screen of the mobile terminal based on the inclination angle and the corresponding inclination direction.

Step B can include the following: determining a rotation direction and a rotation angle of the interface content based on the inclination direction and the inclination angle; and rotating the interface content by the determined rotation angle in the determined rotation direction.

In an implementation, when a plurality of inclination angles are determined, a process of determining the rotation direction and the rotation angle of the interface content based on the inclination direction and the inclination angle can include the following: selecting, from the plurality of inclination angles, a first inclination angle that does not exceed a second threshold; determining the first inclination angle as the rotation angle; and determining that an inclination direction corresponding to the first inclination angle is the rotation direction. It is worthwhile to note that the first inclination angle that does not exceed the second threshold is an angle that is less than or equal to the second threshold.

Figure 3B:
FIG. 3b is a first schematic diagram illustrating interface content on a screen of a mobile terminal, according to the present application.

Assume that the second threshold is 90°. In FIG. 3a, because the inclination angle α1 does not exceed the second threshold, it can be determined that a rotation angle of the barcode image is α1 and a rotation direction of the barcode image is a downward inclination direction, namely, the inclination direction corresponding to α1. Therefore, a process of adjusting the display direction of the interface content on the screen of the mobile terminal includes the following: rotating the barcode image by the angle of α1 in the downward inclination direction, in other words, rotating the barcode image clockwise by the angle of α1, to obtain a display direction of the barcode image shown in FIG. 3b. In FIG. 3b, a direction of the first beam is consistent with the display direction of the barcode image. Therefore, it can be convenient for the code scanning gun to recognize the barcode image.

Figure 4A:
FIG. 4a is a second schematic diagram illustrating an angle between a first beam and interface content, according to the present application.
Figure 4B:
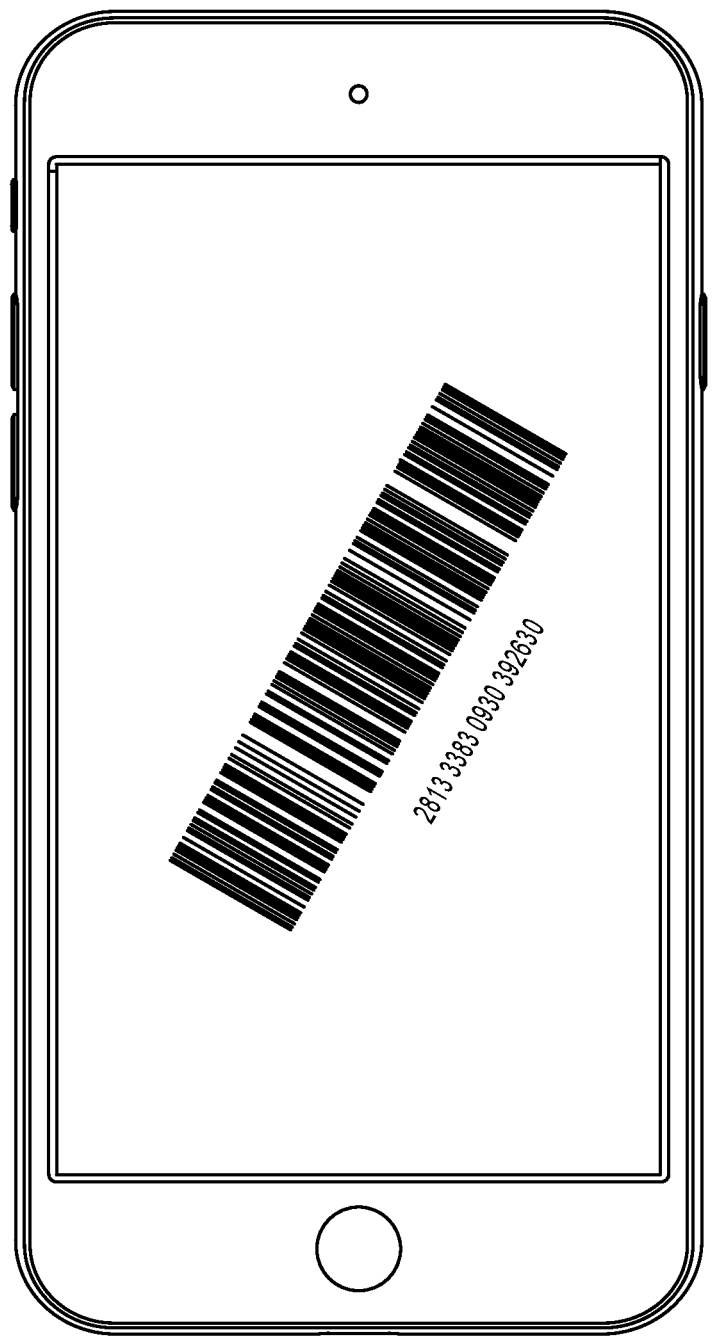
FIG. 4b is a second schematic diagram illustrating interface content on a screen of a mobile terminal, according to the present application.

In another example, when an angle between the first beam and the display direction of the barcode image is shown in FIG. 4a, and assume that both angles in FIG. 4a are greater than the first threshold, it can be determined that the first beam is in the inclined state. Therefore, two inclination angles α3 and α4 can be obtained, an inclination direction corresponding to α3 is the downward inclination direction, and an inclination direction corresponding to α4 is the upward inclination direction. Because the inclination angle α4 does not exceed the second threshold, it can be determined that a rotation angle of the barcode image is α4, and a rotation direction of the barcode image is the upward inclination direction, namely, the inclination direction corresponding to α4. Therefore, a process of adjusting the display direction of the interface content on the screen of the mobile terminal includes the following: rotating the barcode image by the angle of α4 in the upward inclination direction, in other words, rotating the barcode image anticlockwise by the angle of α4, to obtain a display direction of the barcode image shown in FIG. 4b. In FIG. 4b, a direction of the first beam is consistent with the display direction of the barcode image. Therefore, it can be convenient for the code scanning gun to recognize the barcode image.

Certainly, in practice, the predetermined threshold can also be set to another value. Implementations are not limited in the present application.

Optionally, a rotation center can be determined before the interface content is rotated by the determined rotation angle in the determined rotation direction. In an example, the rotation center can be determined based on a reference object of the predetermined direction. For example, when the reference object is the mobile terminal, the plane on which the touchscreen of the mobile terminal is located, the X-axis and the Y-axis of the plane on which the touchscreen of the mobile terminal is located, etc., the determined rotation center can be a center of the screen of the mobile terminal. Alternatively, when the reference object is the horizontal plane, the X-axis and the Y-axis of the horizontal plane, etc., the determined rotation center can be a center of the horizontal plane (namely, an intersection point of the X-axis and the Y-axis of the horizontal plane). Alternatively, when the reference object is the vertical plane, the X-axis and the Y-axis of the vertical plane, etc., the determined rotation center can be a center of the vertical plane (namely, an intersection point of the X-axis and the Y-axis of the vertical plane).

When the rotation center is further determined, the step of rotating the interface content by the determined rotation angle in the determined rotation direction can be replaced with the following: rotating the interface content by the determined rotation angle in the determined rotation direction by using the determined rotation center as a center.

It is worthwhile to note that when the detected first beam is not in the inclined state, the display direction of the interface content on the screen of the mobile terminal may not be adjusted.

It can be seen that in the present application, when the first beam emitted by the recognition apparatus is in the inclined state, the mobile terminal automatically adjusts the display direction of the interface content on the screen of the mobile terminal based on the inclined state of the first beam, so that interface content that has a strict requirement on a recognition angle can be recognized easily, further improving user experience.

When the interface content is a barcode image, the code scanning gun can read a value of the barcode image only when the code scanning gun and the barcode image face each other and rotation angles of the code scanning gun and the barcode image are similar. Therefore, in the present application, according to a method for automatically adjusting the display direction of the barcode image based on an inclined state of the infrared beam emitted by the code scanning gun, problems of poor user experience that are caused because the user needs to repeatedly adjust a location of the code scanning gun can be alleviated.

Figure 5:
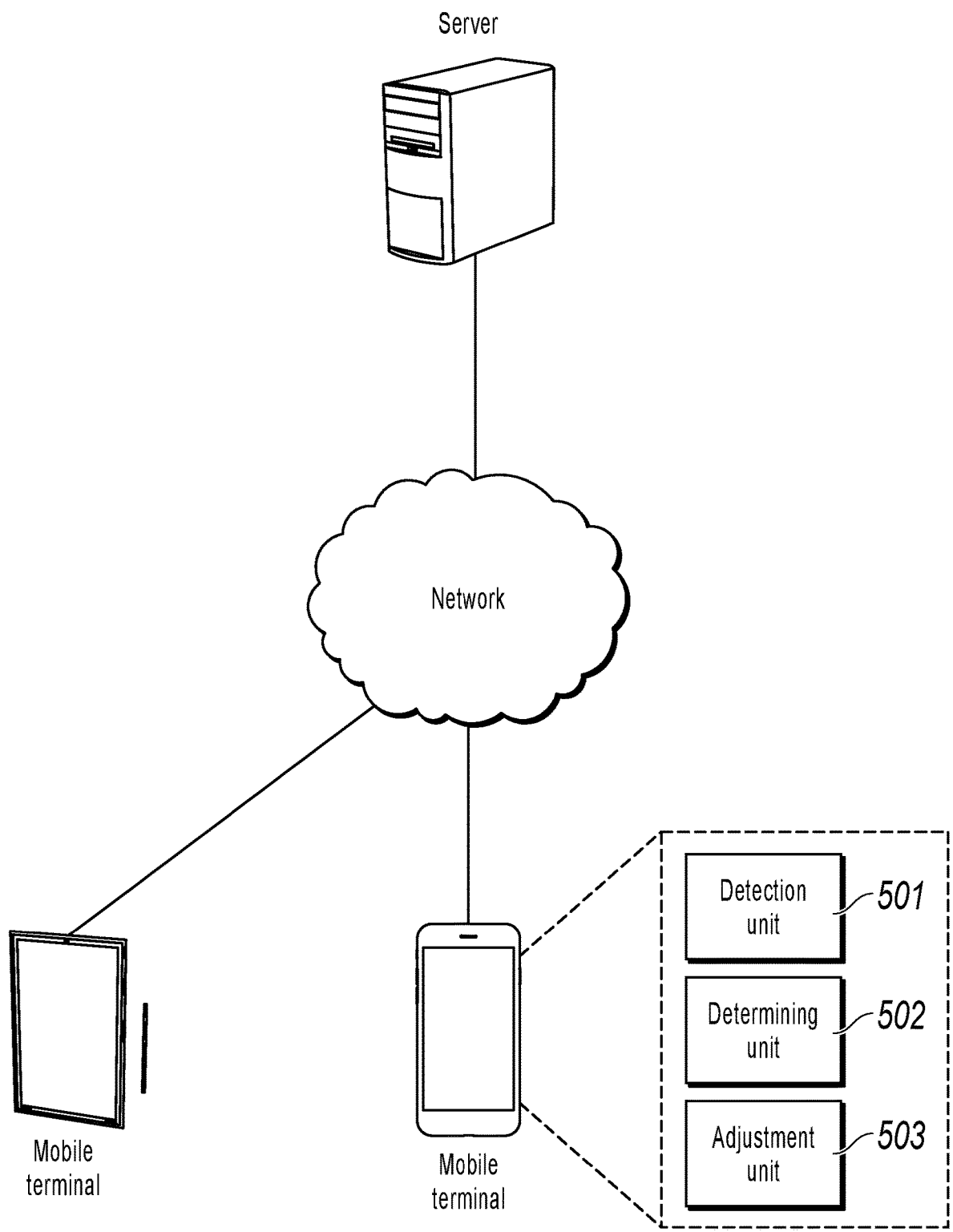
FIG. 5 is a schematic diagram illustrating a mobile terminal, according to an implementation of the present application.

Corresponding to the previous method for controlling display of a screen of a mobile terminal, an implementation of the present application further provides a mobile terminal. As shown in FIG. 5, the mobile terminal includes a detection unit 501, a determining unit 502, and an adjustment unit 503.

The detection unit 501 is configured to detect a first beam.

The determining unit 502 is configured to determine whether the first beam detected by the detection unit is in an inclined state, where the inclined state indicates that the first beam has an inclination angle that is greater than a first threshold in a predetermined direction, and the predetermined direction is determined based on a display direction of interface content on a screen of the mobile terminal.

The predetermined direction can include an upward direction, a downward direction, a leftward direction, a rightward direction, a left-upward direction, a left-downward direction, a right-upward direction, or a right-downward direction.

The adjustment unit 503 is configured to: when the determining unit 502 determines that the detected first beam is in the inclined state, adjust the display direction of the interface content on the screen of the mobile terminal based on the inclined state of the first beam.

Optionally, the adjustment unit 503 can be configured to: obtain an inclination angle of the first beam and a corresponding inclination direction based on the inclined state of the first beam; and adjust the display direction of the interface content on the screen of the mobile terminal based on the inclination angle and the corresponding inclination direction.

Optionally, the adjustment unit 503 can be further configured to: determine a rotation angle of the interface content and a corresponding rotation direction based on the inclination angle and the corresponding inclination direction; and rotate the interface content by the rotation angle in the determined rotation direction.

Optionally, when there are a plurality of inclination angles, the adjustment unit 503 can be further configured to: select, from the plurality of inclination angles, a first inclination angle that does not exceed a second threshold; determine the first inclination angle as the rotation angle; and determine that an inclination direction corresponding to the first inclination angle is the rotation direction.

Functions of function modules of the apparatus in the present implementation of the present application can be implemented by performing the steps in the previous method implementation. Therefore, a specific working process of the apparatus provided in the present application is omitted here.

According to the mobile terminal provided in the present application, the detection unit 501 detects the first beam. The determining unit 502 determines whether the detected first beam is in the inclined state. When the detected first beam is in the inclined state, the adjustment unit 503 adjusts the display direction of the interface content on the screen of the mobile terminal based on the inclined state of the first beam. Therefore, efficiency of recognizing the interface content on the screen of the mobile terminal is improved.

A person skilled in the art should be aware that in the previous one or more examples, functions described in the present disclosure can be implemented by hardware, software, firmware, or any combination thereof. When the functions are implemented by software, the functions can be stored in a computer readable medium or transmitted as one or more instructions or code in the computer readable medium.

The objectives, technical solutions, and benefits of the present disclosure are further described in detail in the previous specific implementations. It should be understood that the previous descriptions are merely specific implementations of the present disclosure, but are not intended to limit the protection scope of the present disclosure. Any modification, equivalent replacement, improvement, etc. made based on the technical solutions of the present disclosure shall fall within the protection scope of the present disclosure.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method comprising:
   detecting, by a mobile terminal, a beam emitted by a code recognition apparatus towards a display of an interface content of the mobile terminal, the interface content comprising a code;
   determining, by the mobile terminal, supplementary inclination angles of the beam and a corresponding inclination direction of the beam relative to an orientation of the mobile terminal;
   determining that both of the supplementary inclination angles of the beam relative to the orientation of the mobile terminal are greater than a threshold; and
   in response to determining that both of the supplementary inclination angles of the beam relative to the orientation of the mobile terminal are greater than the threshold, automatically adjusting, by the mobile terminal, the display of the code on the mobile terminal according to the supplementary inclination angles of the beam and the corresponding inclination direction.

2. The computer-implemented method of claim 1, wherein automatically adjusting the display of the interface content comprises:
   obtaining an inclination direction based on an inclined state of the beam; and
   adjusting the interface content based on the supplementary inclination angles of the beam and a corresponding inclination direction.

3. The computer-implemented method of claim 2, wherein adjusting the display of the interface content comprises:
   determining a rotation angle of the interface content and a rotation direction based on the supplementary inclination angles of the beam and the corresponding inclination direction; and
   rotating the interface content by the rotation angle in the rotation direction.

4. The computer-implemented method of claim 3, wherein determining the supplementary inclination angles of the beam comprises:
   determining that the supplementary inclination angles of the beam comprises two inclination angles.

5. The computer-implemented method of claim 4, further comprising:
   selecting, from the supplementary inclination angles, a first inclination angle that does not exceed a second threshold;
   determining the first inclination angle as the rotation angle.

6. The computer-implemented method of claim 2, wherein the corresponding inclination direction comprises an upward direction, a downward direction, a leftward direction, a rightward direction, a left-upward direction, a left-downward direction, a right-upward direction, or a right-downward direction.

7. The computer-implemented method of claim 1, wherein the mobile terminal comprises a sensor configured to detect the beam.

8. The computer-implemented method of claim 7, wherein the sensor comprises an active-pixel sensor.

9. The computer-implemented method of claim 8, wherein the active-pixel sensor comprises a charge-coupled device image sensor or a complementary metal-oxide semiconductor image sensor.

10. The computer-implemented method of claim 1, wherein the beam comprises a laser beam, an infrared beam, or a visible beam.

11. A mobile terminal, the mobile terminal comprising a screen, at least one processor, and a non-transitory computer readable medium storing one or more instructions executable by the at least one processor to perform operations comprising:
   detecting, by a mobile terminal, a beam emitted by a code recognition apparatus towards a display of an interface content of the mobile terminal, the interface content comprising a code;
   determining, by the mobile terminal, supplementary inclination angles of the beam and a corresponding inclination direction of the beam relative to an orientation of the mobile terminal;
   determining that both of the supplementary inclination angles of the beam relative to the orientation of the mobile terminal are greater than a threshold; and
   in response to determining that both of the supplementary inclination angles of the beam relative to the orientation of the mobile terminal are greater than the threshold, automatically adjusting, by the mobile terminal, the display of the code on the mobile terminal according to the supplementary inclination angles of the beam and the corresponding inclination direction.

12. The mobile terminal of claim 11, wherein the corresponding inclination direction comprises an upward direction, a downward direction, a leftward direction, a rightward direction, a left-upward direction, a left-downward direction, a right-upward direction, or a right-downward direction.

13. The mobile terminal of claim 11, wherein the mobile terminal comprises a sensor configured to detect the beam, wherein the sensor comprises an active-pixel sensor.

14. The mobile terminal of claim 13, wherein the active-pixel sensor comprises a charge-coupled device image sensor or a complementary metal-oxide semiconductor image sensor.

15. The mobile terminal of claim 11, wherein the beam comprises a laser beam, an infrared beam, or a visible beam.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
   detecting, by a mobile terminal, a beam emitted by a code recognition apparatus towards a display of an interface content of the mobile terminal, the interface content comprising a code;
   determining, by the mobile terminal, supplementary inclination angles of the beam and a corresponding inclination direction of the beam relative to an orientation of the mobile terminal;
   determining that both of the supplementary inclination angles of the beam relative to the orientation of the mobile terminal are greater than a threshold; and
   in response to determining that both of the supplementary inclination angles of the beam relative to the orientation of the mobile terminal are greater than the threshold, automatically adjusting, by the mobile terminal, the display of the code on the mobile terminal according to the supplementary inclination angles of the beam and the corresponding inclination direction.

17. The computer-implemented system of claim 16, wherein the corresponding inclination direction comprises an upward direction, a downward direction, a leftward direction, a rightward direction, a left-upward direction, a left-downward direction, a right-upward direction, or a right-downward direction.

18. The computer-implemented system of claim 16, further comprising a sensor configured to detect the beam, wherein the sensor comprises an active-pixel sensor.

19. The computer-implemented system of claim 18, wherein the active-pixel sensor comprises a charge-coupled device image sensor or a complementary metal-oxide semiconductor image sensor.

20. The computer-implemented system of claim 16, wherein the beam comprises a laser beam, an infrared beam, or a visible beam.

* * * * *